United States Patent
Dubs et al.

(10) Patent No.: US 9,810,069 B2
(45) Date of Patent: Nov. 7, 2017

(54) REPAIR OF A SHROUDED BLADE

(71) Applicant: ANSALDO ENERGIA SWITZERLAND AG, Baden (CH)

(72) Inventors: Gregory Alan Dubs, Palm Beach Gardens, FL (US); Thomas Horace Milidantri, Jensen Beach, FL (US)

(73) Assignee: ANSALDO ENERGIA SWITZERLAND AG (CH)

( * ) Notice: Subject to any disclaimer, the term of this patent is extended or adjusted under 35 U.S.C. 154(b) by 1079 days.

(21) Appl. No.: 13/917,876

(22) Filed: Jun. 14, 2013

(65) Prior Publication Data

US 2014/0003948 A1    Jan. 2, 2014

Related U.S. Application Data

(60) Provisional application No. 61/667,090, filed on Jul. 2, 2012.

(51) Int. Cl.
*F01D 5/00* (2006.01)
*B23P 6/00* (2006.01)

(52) U.S. Cl.
CPC .............. *F01D 5/005* (2013.01); *B23P 6/007* (2013.01); *Y10T 29/49318* (2015.01)

(58) Field of Classification Search
CPC ........... F01D 5/005; B23P 6/002; B23P 6/007
See application file for complete search history.

(56) References Cited

U.S. PATENT DOCUMENTS

| | | | |
|---|---|---|---|
| 4,128,929 A | 12/1978 | DeMusis | |
| 4,155,152 A | 5/1979 | Cretella et al. | |
| 4,291,448 A * | 9/1981 | Cretella | B23P 6/007 29/402.07 |
| 6,543,134 B2 * | 4/2003 | Meier | B23P 6/007 29/402.18 |

FOREIGN PATENT DOCUMENTS

| | | |
|---|---|---|
| DE | 102009052882 A1 | 5/2011 |
| EP | 1207004 A2 | 3/2004 |

OTHER PUBLICATIONS

PCT Search Report dated Oct. 9, 2013 re PCT/US2013/048135, 7 pages.

* cited by examiner

*Primary Examiner* — Gregory Anderson
*Assistant Examiner* — Cameron Corday
(74) *Attorney, Agent, or Firm* — Hovey Williams LLP; Peter C. Knops

(57) ABSTRACT

The present invention discloses a novel and improved method for repairing a shrouded blade and a reconditioned shrouded blade. More specifically, a way of measuring a set of previously-operated blades to determine their post-operation geometric characteristics is provided where an offset due to deformation of the hardface surfaces of the shroud is determined. The hardface surfaces of the shroud are rough-machined and blade-compatible material is added to the hardface surfaces. A first side hardface surface of the shroud is then machined to a desired dimension offset relative to an originally manufactured blade after which a second side hardface surface is machined such that the distance between the hardface surfaces satisfies the cross-shroud dimension, which is similar to that of an originally manufactured blade.

12 Claims, 3 Drawing Sheets

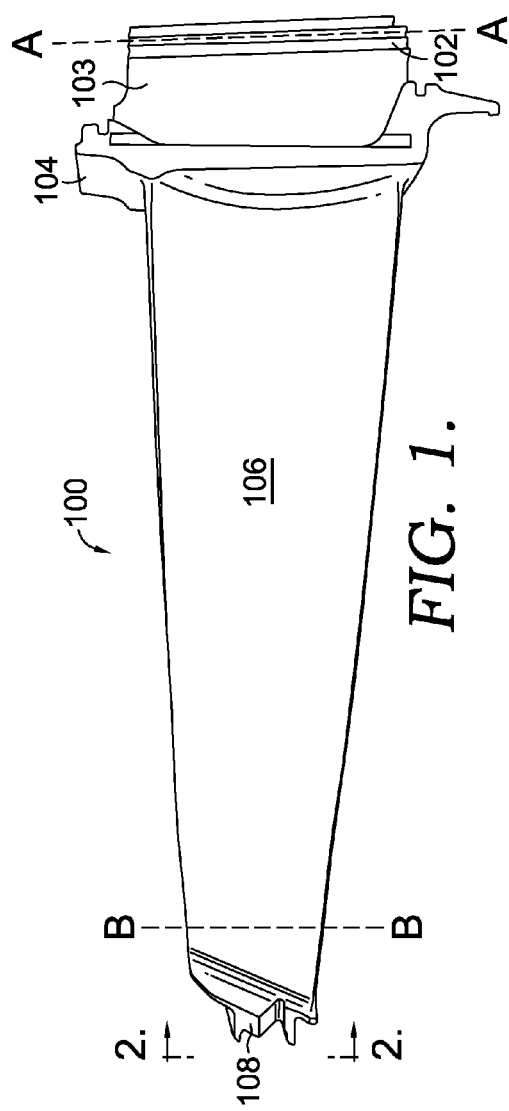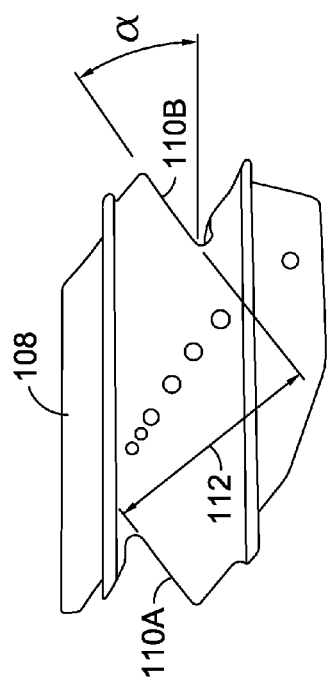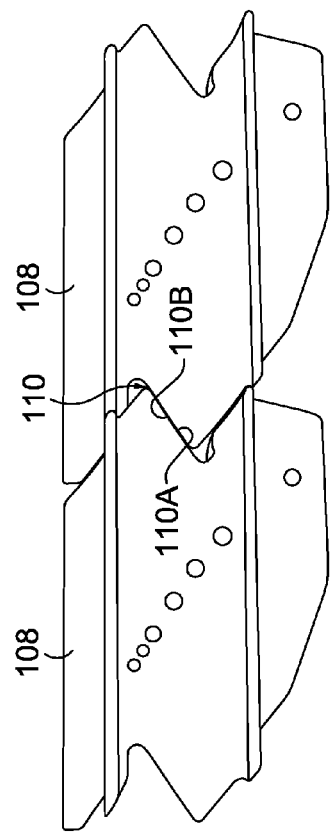

REPAIR OF A SHROUDED BLADE

CROSS-REFERENCE TO RELATED APPLICATIONS

This application claims priority to U.S. Provisional Patent Application Ser. No. 61/667,090 filed Jul. 2, 2012.

TECHNICAL FIELD

The present invention generally relates to a method of repairing a shrouded blade. More specifically, the present invention is directed towards a process by which a set of shrouded blades is refurbished by incorporating movement of the airfoil due to engine operation into the repairs made to a blade shroud.

BACKGROUND OF THE INVENTION

In a typical gas turbine engine, a compressor having alternating stages of rotating and stationary airfoils is coupled to a turbine, which also has alternating stages of rotating and stationary airfoils. The compressor stages decrease in size to compress the air passing therethrough. The compressed air is then supplied to one or more combustors which mixes the air with fuel and ignites the mixture. The expansion of the hot combustion gases drives the stages of a turbine, which is coupled to the compressor to drive the compressor. The exhaust gases can then be used as a source of propulsion or in powerplant operations to turn a shaft coupled to a generator for producing electricity.

Blades used in compressors and turbines can have a variety of shapes and sizes depending on the operating conditions. One feature commonly found on large blades is a shroud. The shroud is essentially a platform extending outward from the airfoil at a distance along the airfoil or at the tip of the airfoil. Shrouds can help dampen any vibrations in the airfoil that occur during operation that are at least in part due to the size of the airfoil.

In operation, the shrouds of the blades are known to wear to varying degrees due to shroud-to-shroud rubbing and mechanical loading. Furthermore, the blade can deflect in the axial and tangential directions as well as twist. That is, the blade, including the airfoil and attached shroud, have plastically deformed during engine operation from their originally-manufactured state.

Blades can often be repaired and reused, often as all parts from one engine or a set. Prior repair techniques have attempted to repair shrouds to original manufactured dimensions and by doing so have not accounted for the deformation the blade has undergone during operation, thereby resulting in more extensive blade repairs and the potential to change the dimensional relationship of the mating surfaces relative to the airfoil.

SUMMARY

In accordance with the present invention, there is provided a novel and improved method for repairing a blade having a shroud after gas turbine operation. The present invention is directed towards a way of measuring a set of previously-operated blades to determine their post-operation geometric characteristics and determining an offset of the hardface surfaces of the shroud portion of the blade due to engine-induced deformation. The hardface surfaces of the shroud are then machined to a first dimension and blade-compatible material is added to the hardface surfaces of the shroud. Next, a first side hardface surface of the shroud is machined to a desired offset dimension after which a second side hardface surface is machined such that the distance between the hardface surfaces satisfies the cross-shroud dimension similar to that of an originally manufactured blade. Such repair processes allows reuse of a turbine blade by accounting for movement of the shroud and wear on shroud hardfaces with minimal change of the as-designed dimensional relationship of the shroud surfaces relative to the airfoil.

In an alternate embodiment, a reconditioned gas turbine blade is disclosed where the blade comprises a dovetail, a shank extending radially outward from the dovetail, a platform extending tangentially and axially outward from the shank, an airfoil extending radially outward from the platform, and a shroud extending tangentially and axially outward from the airfoil. The shroud has an inner generally planar surface and an outer generally planar surface whose outer edges are partially defined by a pair of parallel hardface surfaces. The pair of parallel hardface surfaces is machined to a desired offset distance according to the as-measured position of the hardface surfaces for a set of blades while being spaced apart by a cross shroud dimension that is essentially equal to a cross shroud dimension for a new blade. The desired offset is usually the arithmetic mean, mode or median of the data in order to minimize blade-to-blade variation.

In yet another embodiment of the present invention, a method of returning a set of previously-operated shrouded blades to an operational condition is disclosed. The method comprises determining a displacement for shroud hardface surfaces, determining an amount of material to be removed and added to the shroud hardface surfaces and conducting a final machining to bring the shroud hardface surfaces to the desired dimensions.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 1 is a perspective view of a new gas turbine blade in accordance with an embodiment of the present invention;

FIG. 2 is a top elevation view of a shroud of the blade of FIG. 1 in accordance with an embodiment of the present invention;

FIG. 3 is a top elevation view of adjacent blades of FIG. 1 in accordance with an embodiment of the present invention;

DETAILED DESCRIPTION

Figure 4:
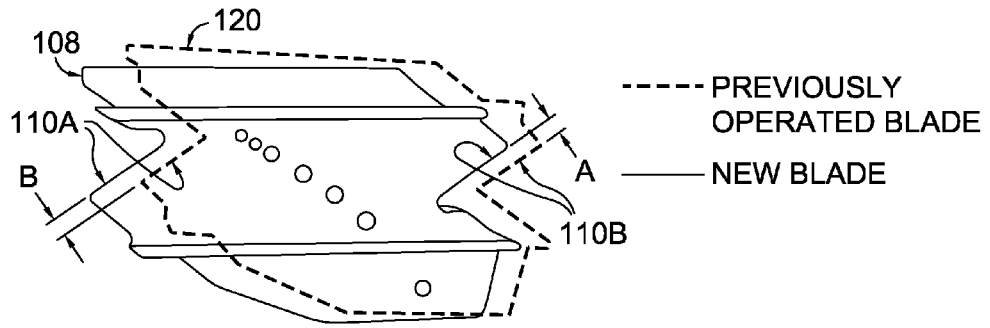
FIG. 4 is a top elevation view of a shroud of a new turbine blade overlaid with a shroud of a previously operated turbine blade demonstrating typical deformation occurring during blade operation.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

The present invention is shown in detail in FIGS. 1-7 and can be applied to a variety of shrouded blades exhibiting deflections or deformations caused by engine operation. The present invention provides a reconditioned blade and process by which the shroud of a blade which exhibits deflection and/or displacement usually caused by engine use can be refurbished while greatly maintaining the shroud-to-airfoil relationship of an originally-manufactured blade.

Referring initially to FIGS. 1 and 2, a blade 100 in accordance with the present invention is disclosed. The blade 100 in this embodiment is a turbine blade that includes a dovetail 102, a shank 103 extending radially outward from the dovetail 102, a platform 104 extending tangentially and axially outward from the shank 103, and an airfoil portion 106 extending radially outward from the platform 104. The present invention is not limited to application on a turbine blade, but instead can be applied to other blades such as compressor blades. Extending tangentially and axially outward from the airfoil 106 is a shroud 108. Shroud portions are commonly used in blades to prevent or reduce vibrations in blades having a long airfoil span. As one skilled in the art understands, a set of blades having shrouds is oriented in slots of a rotating disk such that the airfoils extend radially outward from the slots and the shrouds of adjacent blades contact each other, as depicted in FIG. 3. Shroud 108 includes a hardface region 110 and more specifically, hardface surfaces 110A and 110B. This contact between adjacent shrouds 108 generally occurs at two mating hardface surfaces 110A and 110B of the shroud 108, as shown in FIG. 3. Hardface surfaces 110A and 110B are oriented at an angle a (depicted in FIG. 2) relative to the blade's axis of rotation, which is generally perpendicular to datum A-A in FIG. 1. In operation, the hardface surfaces 110A and 110B tend to rub and wear against each other.

In order to extend the operating life of the turbine blade 100, one of the areas necessary to repair is the shroud 108, and especially the hardface surface region 110. Prior repairs to extend the useful life of the blade typically result in a blade-compatible material which is harder and/or more wear-resistant to be utilized on surfaces 110.

As previously discussed, blades operating at elevated temperatures have been known to undergo permanent axial and tangential displacements as well as to twist under the thermal and mechanical loadings applied to the blade during operation. Some blades have measured displacements upwards of 0.060 inches from nominal. Previously, operators and repair shops would attempt to restore the shroud configuration to original blueprint dimensions. However, because of the displacement of the airfoil in an axial and/or tangential direction, as well as twisting of the airfoil, significant amounts of repairs are necessary to the shroud. However, the shroud has moved from its newly manufactured position. Referring to FIGS. 2-5, each of the shroud overlays shown are taken with the blade being held at the blade dovetail. Referring to FIG. 4, two images of a shroud are depicted. Both images shown depict a top view of the shroud as if the blade is being held at the dovetail in a blade disk (not shown). The shape 120 of a previously-operated shroud is depicted by a dashed line while the shape of a newly-manufactured shroud 108 is depicted by a solid line. The difference is a demonstration of the tangential and axial deflection and twist which occurs due to operation.

Due to the displacements and rotation of the airfoil 106, and in order to restore the shroud to its originally-manufactured dimensions, the repaired shape 120 requires the addition of a significant amount of material along a first hardface surface, indicated as distance B between the two surfaces 110A in FIG. 4, and significant removal of material along a second, and opposing, hardface surface, indicated as distance A between the two surfaces 110B in FIG. 4. According to prior art repair techniques, with each repair cycle to the blade, the shroud 108 continues to move in multiple directions relative to the airfoil. That is, while it is possible to restore the hardfaces of the shroud to an originally-manufactured dimension relative to the root datum A-A in FIG. 1, the shroud-to-airfoil position will continue to change with each repair cycle of the blade due to continued displacement and twisting of the airfoil. Furthermore, these significant amounts of material build-up and material removal required to return the shroud to originally-manufactured specifications changes the design aspects of the shroud, such as weight and balance, potentially causing accelerated or new modes of distress thereby adding significant repair costs and time to reconditioning a set of blades or, in the worst scenario, scrapping of the blade.

The present invention provides an improved repair process where the axial and tangential displacement of the airfoil and shroud are accounted for by determining an offset of the shroud hardface surfaces. Typically, the arithmetic mean, mode or median for the set of blades is determined in order to identify the offset. This offset is used to determine the amount of material that is to be added or removed to the mating faces of shrouds for a set of blades, such that critical airfoil-to-shroud relationships are generally maintained. By relying on the offset of the shroud hardfaces and only re-machining the angle of the shroud hardface surfaces and the distance between the hardfaces to new-manufacture requirements, changes to the shroud design as a result of prior operation are minimized.

Figure 5:
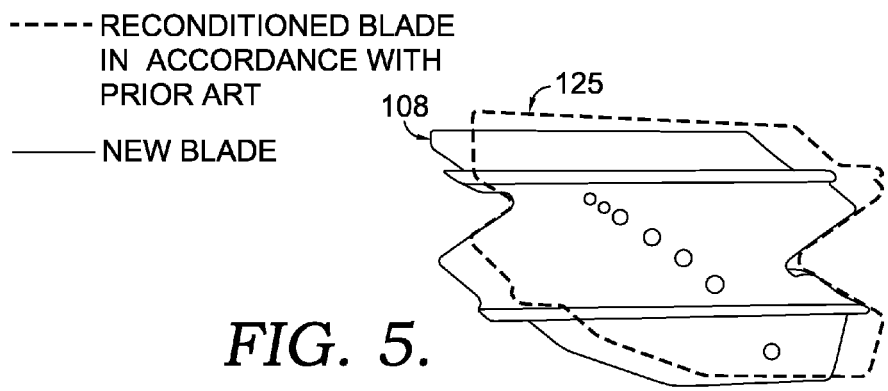
FIG. 5 is a top elevation view of a shroud of a new turbine blade overlaid with a shroud of a turbine blade reconditioned in accordance with a prior art repair method.

FIG. 5 depicts two images of a shroud, one repaired in accordance with the process of the prior art. The shape 125 is that of a previously-operated repaired shroud and is depicted by a dashed line while the shape of a newly-manufactured shroud 108 is depicted by a solid line. In this prior repair, significant amounts of material would have to be removed or added to the shroud faces.

Figure 6:
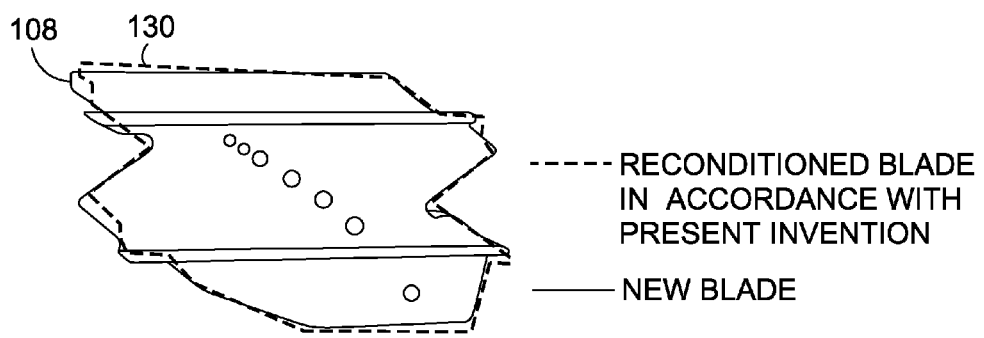
FIG. 6 is a top elevation view of a shroud of a new turbine blade overlaid with a shroud of a turbine blade reconditioned in accordance with an embodiment of the present invention and aligned such that the hardfaces overlay the new turbine blade; and, FIG. 7 is a flow diagram outlining a process for reconditioning a shrouded blade in accordance with an embodiment of the present invention.

FIG. 6 depicts two images of a shroud, one repaired in accordance with the present invention. The repaired shape 130 of a previously-operated shroud is depicted by a dashed line while the shape of a newly-manufactured shroud 108 is depicted by a solid line. FIG. 6 shows these two shapes aligned on surfaces 110. As it can be seen by comparing FIGS. 5 and 6, far less dimensional distortion of the shroud is required when the shroud is repaired in a manner that takes into consideration the tangential and axial deflection of the shroud and airfoil. That is, by determining the amount of movement of each shroud in a blade set, the arithmetic mean, mode or median of the data is used as the starting point for repairs to the blades.

In the event that the wear to the blade is beyond a point of being repaired, even under the repair procedure disclosed of herein, the set of turbine blades can still be repaired using a majority of the previously-run turbine blades. When a turbine blade is beyond repair, it is replaced with a new turbine blade, which is then subjected to the repair processes disclosed herein, causing the new turbine blade to generally take on the geometric configurations of a previously-operated blade repaired with the present invention.

Figure 7:
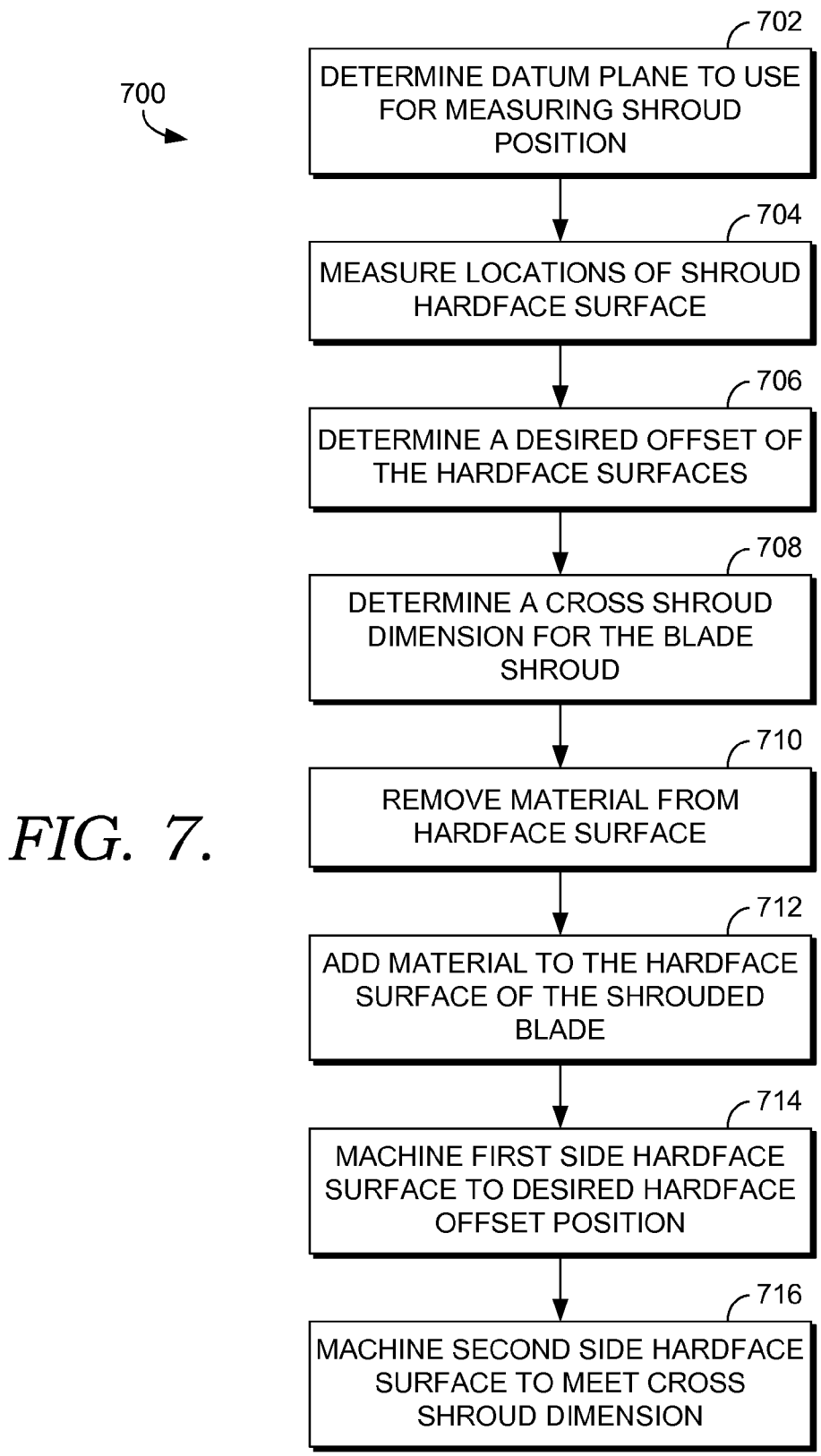

Referring to FIG. 7, a process 700 for repairing the shroud 108 is disclosed. In a step 702, a determination is made as to which datum plane(s) will be used to measure dimensions of the shroud. Traditionally, most, if not all, machining of a shroud occurs relative to a blade dovetail datum A-A, which is located in space at a known distance relative to the dovetail portion 102 of the blade. This primary datum A-A is depicted in FIG. 1. Alternatively, a secondary datum can be used from which dimensions of the shroud are measured. The secondary datum B-B is located proximate an interface between the shroud and airfoil of the blade and is also shown in FIG. 1.

In a step 704, the locations of the hardface surfaces 110A and 110B of the shroud 108 as depicted in FIG. 2 are measured relative to the datum chosen in step 702. The locations of the hardface surfaces 110A and 110B can be determined by a variety of means, such as by a type of coordinate measuring machine (CMM) that is capable of measuring the physical location of the hardface surfaces 110A and 110B in space relative to the datum of choice. Then, in a step 706, the desired offset of the finished-repair hardface surfaces 110A and 110B is determined, which as discussed above, is typically the arithmetic mean, mode or median of the location of the hardface surfaces for a set of blades. The desired offset takes into consideration the location of each shroud hardface surface compared to its respective blueprint nominal position for a newly manufactured blade shroud.

In a step 708, a cross shroud dimension 112 for the shrouded blade is determined based on the nominal blueprint condition. As depicted in FIG. 2, the cross shroud dimension 112 is the distance between parallel hardfaces surfaces 110A and 110B. For the embodiment of the present invention depicted in FIGS. 1-6, the preferred cross shroud dimension is approximately 1.475 inches. The desired cross shroud dimension 112 will vary depending on the size and shape of the shroud 108. It should be noted that all discussions contained within are relative to hardface surface angles as generally depicted in FIG. 2. The angles of hardface surfaces 110A and 110B in a view similar to FIG. 1, but rotated to put the hardface surface plane on edge, is always determined based on the nominal blueprint condition.

In a step 710, a predetermined amount of material on the hardface surfaces 110A and 110B relative to the finish-repair surface location, as defined in step 706 above, is removed to a depth necessary to provide an acceptable surface to which material can then be added for purposes of building up the hardface surface. This is necessary to remove any uneven regions and to prepare the hardface surface for repair. Material can be removed by a variety of acceptable means such as grinding, either manually or by machine. In some cases, it is more practical to group blades with similar material removal needs together and define one removal depth for the group. This leads to multiple group depth removal targets within one set of blades.

Then, in a step 712, material suitable for the hardface surface of the shroud and compatible to the blade material is added to the hardface surface 110A and 110B by a means such as welding, brazing, plasma spray or other form of acceptable permanent bonding of the materials. Once material has been added to the hardface surfaces 110A and 110B, a first mating surface, 110A as depicted in FIG. 4, is machined in a step 714 to the desired offset dimension as determined in step 706. This machining, as with the rough machining of the hardface surfaces 110A and 110B in step 710, can be accomplished by a means such as grinding. Once the first mating surface has been machined to the desired offset dimension, the second mating surface 110B, as depicted in FIG. 4, is machined in a step 716. The surfaces are machined such that the resulting distance between the first mating surface 110A and the second mating surface 110B is the same as the cross shroud dimension 112 of an originally-manufactured blade given the machining tolerance variability. Therefore, the shroud hardface surfaces 110A and 110B are returned to their relationship relative to each other in terms of angle and distance to meet the operational position as shown in FIG. 3. This ensures sufficient engagement and contact for damping purposes when compared to the dimensions of originally manufactured blade shrouds.

The present invention repair process also seeks to minimize imbalance to the shroud that can occur by attempts to restore the entire shroud to its originally-manufactured position. That is, with severe initial operation or additive operating cycles, the airfoil continues to further deflect and twist, causing the shroud position to move further away from the originally manufactured condition. While the shroud hardface surfaces can be moved through machining and addition of new material, the airfoil position remains unchanged. Therefore, attempting to return the shroud to an originally-manufactured location through each subsequent repair cycle causes large amounts of material to be added to one side of the shroud and removal of large amounts of material from the opposing side of the shroud. The effect is a reposition of the shroud along the tip of the airfoil. This repositioning of the shroud creates an imbalance in the blade, leading to higher stresses at the blade tip (due to the misbalanced weight of the shroud). By machining the shroud hardface according to the present invention process outlined herein, the amount of material build-up and subsequent machining required is reduced because the entire shroud position is not returned to an original-manufactured position, but the angle of the hardfaces and distance between the hardfaces are returned to original manufactured conditions, while still compensating for the relative displacement of the shrouds.

The present invention has been described in relation to particular embodiments, which are intended in all respects to be illustrative rather than restrictive. Alternative embodiments and required operations, such as machining of shroud faces other than the hardface surfaces and operation-induced wear of the hardfaces, will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of repairing a shrouded blade of a gas turbine engine comprising:
   determining a datum plane from which to measure deflections of the shrouded blade;
   determining spatial position for a plurality of hardface surfaces of a shroud for the blade;
   determining a displacement of the hardface surfaces for each shroud in a set of blades utilizing a mean, mode, or median displacement for the hardface surfaces of a set of shrouded turbine blades;
   determining a cross shroud dimension for the shrouded blade;
   removing material from one or more of the hardface surfaces of the shrouded blade;
   adding material to one or more hardface surfaces of the shrouded blade;
   machining a first side hardface surface to a desired dimension based on the displacement of the hardface surfaces; and
   machining a second side hardface surface such that the distance between the first side hardface and second side hardface corresponds to approximately the cross shroud dimension.

2. The method of claim 1, wherein the datum plane is located adjacent a dovetail of the blade.

3. The method of claim 1, wherein the datum plane is located proximate an interface between the shroud and an airfoil of the blade.

4. The method of claim 1, wherein the hardface surfaces are parallel and extend between an inner generally planar surface and an outer generally planar surface of the shroud.

5. The method of claim 1, wherein the desired dimension of the first hardface surface is determined by measuring a series of surface coordinates.

6. The method of claim 5, wherein the desired dimension is offset from a location of a first side hardface surface of a new blade to account for movement of the shroud due to lean and twist of an airfoil portion of the shrouded blade.

7. The method of claim 5, wherein any wear or other operation-induced deformation of the hardface surfaces are accounted for in determining a location of a first side hardface surface of a new blade.

8. The method of claim 1, wherein determining the mean, mode, or median displacement for the set of blades removes data associated with any blade which will not be repaired.

9. The method of claim 1, wherein the machining of the first side hardface surface and second side hardface surface includes machining of an angle of the hardface surfaces.

10. The method of claim 1, wherein the cross shroud dimension is approximately the same as a cross shroud dimension for a newly manufactured blade of the same size and configuration.

11. The method of claim 1, wherein the material added to the shroud hardface is compatible to the material of the blade.

12. The method of claim 1, wherein the material added is selected to produce desired material properties required of this feature of the blade and remain compatible to the basic alloy of the majority of the blade.

* * * * *